Feb. 13, 1968  R. S. EDWARDS  3,368,756
TEMPERATURE RESPONSIVE VENTILATOR
Filed Dec. 3, 1965
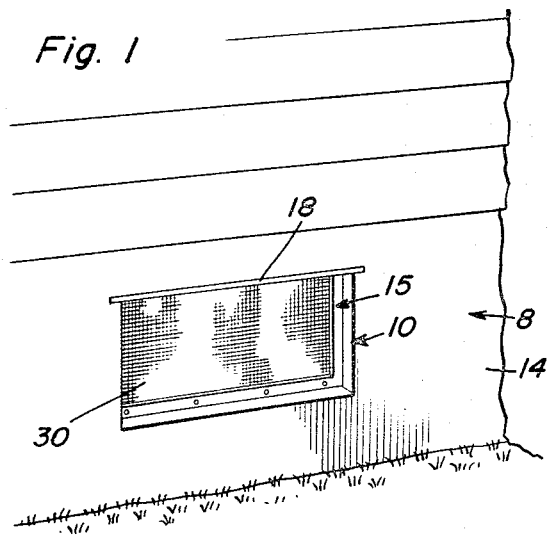
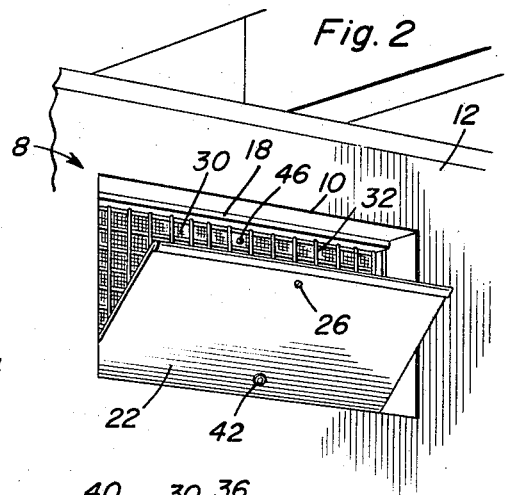
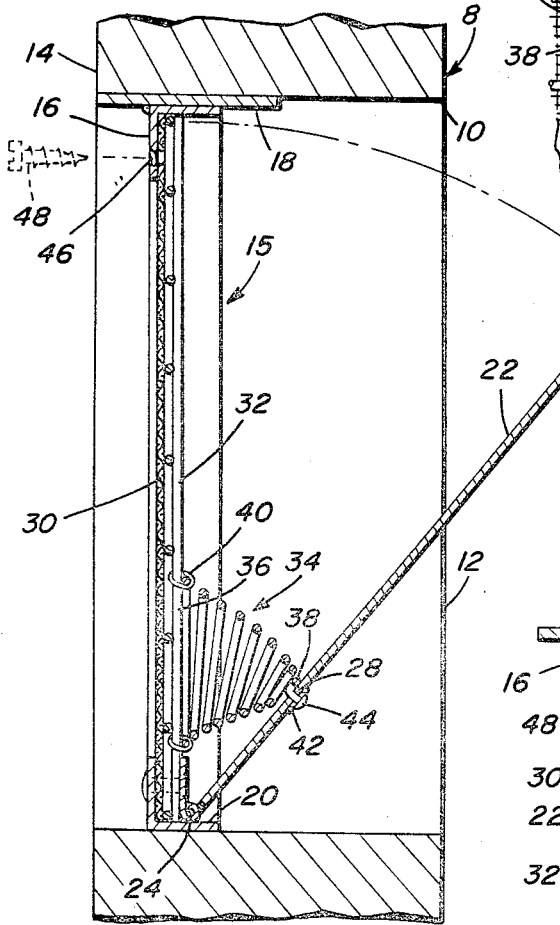
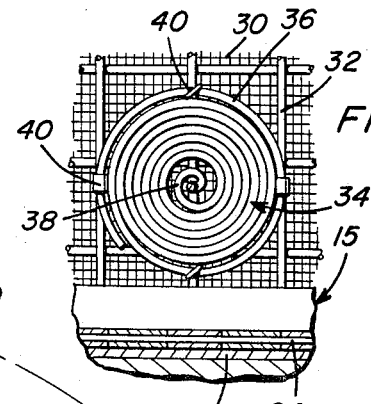
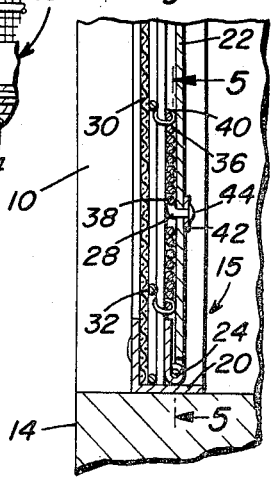
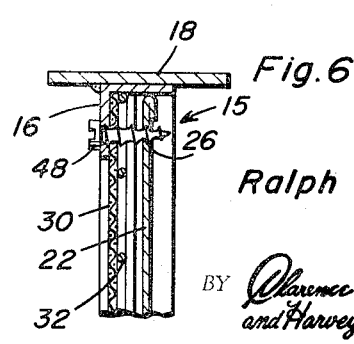
Ralph S. Edwards
INVENTOR.
BY *Clarence A. O'Brien*
and *Harvey B. Jacobson*
Attorneys United States Patent Office 3,368,756
Patented Feb. 13, 1968

3,368,756
TEMPERATURE RESPONSIVE VENTILATOR
Ralph S. Edwards, Rte. 1, Stanley, N.C. 28164
Filed Dec. 3, 1965, Ser. No. 511,444
6 Claims. (Cl. 236—49)

ABSTRACT OF THE DISCLOSURE

A ready-to-install self-contained automatic ventilator for use in an attic or a foundation wall to protect plumbing, to conserve heat, and to dry out a crawl-space during summer whereby to minimize mildew odors and pest problems. It comprises an adapted frame encompassing a reinforced insect screen. A shutter is operatively mounted in the frame. A temperature responsive element, preferably a bendable spiral thermostatic spring, is interposed between the shutter and screen. When outside temperature rises from 40 to 60 degrees the shutter is pushed open. When it drops to 40 degrees the shutter is closed.

---

This invention relates to an improved foundation-type ventilator which is expressly, but not necessarily, designed and uniquely structurally adapted to effectually cope with the recognized need for acceptable underfloor crawl-space ventilation, and has to do, more particularly, with properly conditioning crawl spaces such as are utilized, generally speaking, in homes and buildings.

The absence of appropriate ventilation in crawl spaces results in an undesirable moisture condition which fosters the growth of fungus, promotes pest problems (subterranean termites) and sweating conditions in upper-floor areas. Temperature in the crawl space of a home can best be controlled and maintained by the atmospheric temperature existing outside whereas temperature in an attic, for example, should be and is best controlled by inside temperature. In the past, it has been the prevailing practice to rely on a manually set shutter-type foundation-wall ventilator. Manifestly, however, and considering the over-all problem (ever varying weather conditions) it is impractical to have to continually adjust the shutter in hopes of achieving a satisfactory result. In the summer maximum ventilation is necessary for comfort and pest control, whereas during cold and wintry months protection for plumbing is needed.

To the ends desired, the herein disclosed ventilator is novel in that it utilizes an automatically controlled panel or shutter embodied in a self-contained adaptation which is practical from the viewpoint of manufacturers and sellers and also because it lends itself to ready and simple installation in a vent or opening provided therefor in a foundation wall. The construction and arrangement of coacting component parts offers the user a ventilator which responds automatically to exterior atmospheric temperature conditions and assures requisite, safe and reliable ventilation of the crawl space it serves. Not only is it self-contained and self-operating, it performs the service needed without a need for exterior power supply means.

In carrying out the principles of the present invention a panel-type shuter is hingedly mounted in a suitably screened frame. This shutter is automatically opened and closed through the medium of a thermostatic spring, for example, a suitable temperature responsive spiral spring. This spring provides a simple spring motor which has the capability of responding to changes in temperature in that it opens the shutter subject to a warming temperature condition and closes it when there is a predetermined drop in the temperature. Because the spring is embodied in a novel environment it will function correctly in any aptly installed position; that is, with the screened frame means positioned vertically or upright or, alternatively, lying flat or horizontally in the foundation wall opening.

Briefly, the spring is expansible and contractible and generates a suitable two-pound thrust capable of moving the lightweight shutter to an open position. Contrawise, it has a two-pound pull and automatically swings the shutter panel to its closed position, thus providing an arrangement which insures an adequate seal against the elements, including protection against a high wind.

This invention provides a feasible thermostatically operated ventilator which is susceptible of easy and economical production and is such in construction that it can be transported from the manufacturer to the consumer as an intact unit in that it requires no assembly of composite parts or mechanical or technical skill for installation purposes. This compact unit can be shipped in its closed state regardless of variable temperature changes and with no harm to the thermostatic element. Then, too, the invention features a simple fastener, such as a screw or the like, which is exteriorly accessible at the top of the frame structure or means and which is actually carried by the frame and passes through an opening provided therefor in the shutter or panel to hold the latter in its closed position. This feature constitutes an aid in installing the unit because it retains the shutter in its closed position until the installation job is completed. It also functions to prevent extraneous matter or materials from becoming lodged between the ventilator frame and shutter that might prevent the shutter from closing fully. With this arrangement after installation has been completed the fastener can be removed and the ventilator is then ready for use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a fragmentary perspective view showing the exterior of a foundation wall having a vent or opening in which the improved temperature responsive automatic ventilator is installed for use.

FIG. 2 is a fragmentary perspective view showing the interior of the foundation wall with the panel or shutter in its open ventilating position.

FIG. 3 is an enlarged detail sectional view wherein all of the component parts in this unique self-contained ventilator are shown with the shutter in open position.

FIG. 4 is a view fragmentarily shown and with parts in section and elevation and wherein the shutter is shown closed with the thermostatic spring motor in its flat or collapsed state.

FIG. 5 is a fragmentary view in section and elevation taken on the plane of the vertical section line 5—5 of FIG. 4.

FIG. 6 is a fragmentary sectional view showing the aforementioned screw-type fastener and how it is used.

Referring now to the views of the drawing the foundation wall is denoted at 8 and is provided with a through vent or opening 10 which is here shown as rectangular in configuration. The interior side of the wall is denoted at 12 and the exterior side at 14. It is in this opening that the self-contained ready-to-use crawl-space ventilator is installed. The numeral 15 designates frame means which is fittingly installed within the perimeter limits of the vent or opening 10. The frame means is preferably, but not necessarily, made from angle iron components, the top one of which is denoted at 16 and which in practice is provided with a lintel 18 whose ends are embedded in the concrete, brick or equivalent foundation wall as shown in FIG. 1. The lower or horizontal frame member is denoted at 20 and it is to this member that the imperforate lightweight rectangular panel or shutter 22 is hingedly connected as at 24. The upper median portion of the panel or shutter is provided with a screw-threaded hole at at 26 which serves a purpose to be later described. Also, the lower median portion just above the hinge means 24 is provided with an aperture 28 which will be referred to later.

The numeral 30 designates a fine mesh insect screen which spans the frame opening and is suitably marginally attached to the coacting flanges of the frame members as is evident in FIG. 3.

A companion or complemental screen 32 is also provided and this is a backup and rigidifying screen and may perhaps be best described as an openwork grille-like screen. This screen 32 not only reinforces the structure but provides a highly satisfactory mounting for a coacting end portion of the temperature responsive or thermostatic element. More specifically, this element comprises a spiral spring 34 which is not only a thermostatic element but also constitutes a simple spring motor of the suggested size and shape best shown in FIGS. 3, 4 and 5. This spring is specially formulated and is flexible and bendable and, more specifically, comprises a spiral spring. The outer larger convolution or coil 36 is approximately two inches in circumference and the remaining coils are graduated progressively toward and connected with the smallest convolution or coil 38 which is graduated to the desired zero point. The spring is so constructed that it is flat at approximately 40° F. and has an expansion of three inches with a two-pound thrust when the outside temperature rises to approximately 60°. However, and for different localities involving different temperature ranges the motor can be designed to suit the varying conditions. The coil 36 is connected by suitable clips 40 flatwise to the rod members of the screen 32. The small convolution or coil 38 terminates in a lateral extension which projects through and beyond the aforementioned aperture 28 (FIG. 3) and also through a hole provided therefor in the washer 42 where it is then peened as at 44 to, in this manner, anchor the right hand end portion of the spring 34 whereby it is thus sandwiched or interposed between (1) the shutter 22 and (2) the screen 32 in either the flat or closed position shown in FIGS. 4 and 5 or the expanded shutter opening position shown in FIG. 3. It will be clear however, that the anchoring means for the right hand end portion of the spring 34 is not restrictive inasmuch as any equivalent means may be employed to accomplish the same result.

With reference again to the screw-threaded hole 26 in the upper marginal edge portion of the shutter attention is now directed to a companion screw-threaded hole 46 which is provided in the upper frame member as best shown in FIG. 3. These holes 46 and 26 are adapted to register with each other in the manner shown in FIG. 6 in order to accommodate an exteriorly accessible screw-threaded headed fastener 48. This fastener constitutes a satisfactory aid in installing the unit in that it serves to maintain the shutter in a closed position until the installation step or job has been completed. Stated otherwise, when the screw-fastener 48 is in the position shown in FIG. 6 the shutter remains closed. When the installation job has been completed and the fastener has been removed the shutter is then free to operate as intended.

FIG. 1 shows the complete ready-to-use ventilator as it appears from the outside 14 of the foundation wall 8. FIG. 2 shows the structure from the interior side, that is, within the crawl space (not detailed) with the shutter in its open position. FIG. 3 serves to illustrate not only the thermostatic spring or spring motor 34, it also shows its preferred manner of attachment to the frame means and shutter respectively and illustrates the flexible bendable feature of the spring. When the spring is fully contracted the coils or convolutions are nested within each other in the manner shown in FIGS. 4 and 5.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A crawl-space ventilator expressly designed and adapted for installation in a vent opening in a foundation building wall encompassing said crawl-space comprising: frame means adapted to be mounted in said wall within the marginal portions of said vent opening in said wall, a panel constituting and providing an openable and closable shutter, said panel having a marginal edge hingedly mounted on said frame means and being capable of opening and closing the opening defined by said frame means and being swingable within the perimeter limits of the frame means when fully closed, and means capable of automatically actuating and opening and closing said panel, said means being temperature responsive and adapted to respond to outside atmospheric and temperature conditions, whereby to properly regulate and safely ventilate and condition the temperature within the confines of said crawl-space, said temperature responsive means comprising an expansible and contractible thermostatic element interposed between and operatively connected with said panel and screen, respectively, said element being adapted to automatically contract and pull the panel in to assume a closed position against the frame means at a preset temperature and to automatically expand and forcibly thrust the panel in a direction away from the frame means to assume an open position when acted on by predetermined temperature conditions, said element comprising a flexible arcuately bendable spiral thermostatic spring whose largest convolution is attached to said frame means and whose smallest convolution is attached to said panel, said spring constituting and providing a spring motor whose convolutions are nested into flat form at a given low temperature, say 40° F., and are automatically distended as the temperature increases say to 60°, whereby to generate a given poundage thrust capable of automatically swinging said panel to an open position.

2. A prefabricated self-contained ready-to-install crawl-space ventilator expressly designed and adapted for installation in a vent opening in a foundation building wall encompassing said crawl-space comprising: frame means adapted to be mounted in said wall within the marginal portions of said vent opening, reinforced insect screen means mounted in and spanning the opening encompassed by said frame means, a panel constituting an openable and closable shutter, said panel having a marginal edge hingedly mounted on said frame means and being capable of opening and closing said opening and wholly swingable within the perimeter limits of the frame means when fully closed, and means capable of automatically actuating and opening and closing said panel, said means being temperature responsive and adapted to respond to inside and outside atmospheric and temperature conditions, whereby to properly regulate and safely ventilate and condition the temperature within the confines of said crawl-space, and, in combination, manually attachable and detachable fastener means carried by said frame means and separably connectible with said panel and serving to retain said panel in a closed position, whereby to maintain the component parts in an intact condition for handling, packaging and transportation, and also to aid in installing and until the fastener means is removed and the ventilator is readied for operative use.

3. Then ventilator according to claim 2, and wherein said fastener means comprises a screw-threaded headed fastener carried by one member of said frame means and adapted to be screwed into an alignable hole provided therefor in said panel.

4. A ventilator comprising an adapter frame embodying frame members, one of said frame members provided with a frame positioning and anchoring lintel, a fine mesh screen attached to and spanning the opening encompassed by said frame, an openwork grille-like screen superimposed upon and secured against one side of said first named screen, an imperforate having a marginal edge hingedly joined to a coordinating member of said frame, said panel providing a shutter which is adapted to automatically open and close the screened opening of said frame, a single spiral spring of a given size and tensile strength, said spring being flexible and arcuately bendable and being interposed between the grille-like screen and panel and located adjacent the panel hinging joint, the larger outermost coil of said spring being secured flatwise against said grille-like screen and the smaller innermost coil of said spring being secured to a predetermined portion of said panel.

5. The ventilator according to claim 4, and wherein said panel is provided with an aperture, said small innermost coil having a lateral terminal end extending through and beyond said aperture and an aligned orientated washer and being peened and anchored in place in conjunction with said washer.

6. The ventilator defined in claim 5, and wherein one of the members of said frame is provided with a screw-threaded headed fastener screwed into a hole provided therefor in an edge portion of said panel.

References Cited
UNITED STATES PATENTS

| | | | |
|---|---|---|---|
| 2,814,977 | 12/1957 | Noll | 98—29 |
| 3,027,090 | 3/1962 | Zerhan | 98—37 |

MEYER PERLIN, *Primary Examiner.*